(12) United States Patent
Ozaki et al.

(10) Patent No.: US 10,836,913 B2
(45) Date of Patent: Nov. 17, 2020

(54) ALUMINA SLURRY, METHOD FOR PRODUCING SAME, AND COATING LIQUID

(71) Applicant: SUMITOMO CHEMICAL COMPANY, LIMITED, Chuo-ku, Tokyo (JP)

(72) Inventors: Hirotaka Ozaki, Niihama (JP); Noriaki Fujita, Niihama (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 246 days.

(21) Appl. No.: 15/826,811

(22) Filed: Nov. 30, 2017

(65) Prior Publication Data

US 2018/0079910 A1 Mar. 22, 2018

Related U.S. Application Data

(63) Continuation of application No. 14/416,901, filed as application No. PCT/JP2013/070674 on Jul. 24, 2013, now abandoned.

(30) Foreign Application Priority Data

Jul. 27, 2012 (JP) .................................. 2012-167011

(51) Int. Cl.
  *C09D 1/00* (2006.01)
  *H01M 2/16* (2006.01)
  (Continued)

(52) U.S. Cl.
  CPC ................ *C09D 1/00* (2013.01); *C01F 7/023* (2013.01); *C01F 7/026* (2013.01); *C08K 3/22* (2013.01);
  (Continued)

(58) Field of Classification Search
  None
  See application file for complete search history.

(56) References Cited

U.S. PATENT DOCUMENTS 6,165,437 A 12/2000 Mohri et al.
6,521,203 B1 2/2003 Mohri et al.
(Continued)

FOREIGN PATENT DOCUMENTS

CN 1079715 A 12/1993
JP 2004-227972 A 8/2004
(Continued)

OTHER PUBLICATIONS

Communication dated Aug. 16, 2016, issued by the Japan Patent Office in corresponding Japanese Application No. 2014-527044.
(Continued)

*Primary Examiner* — Scott R. Walshon
*Assistant Examiner* — Elaine M Vazquez
(74) *Attorney, Agent, or Firm* — Sughrue Mion, PLLC

(57) ABSTRACT

Disclosed is an alumina slurry substantially including alpha-alumina particles and water, wherein the alpha-alumina particles satisfy all particle diameter distribution conditions (a) to (d) mentioned below, the alpha-alumina particles have an alumina purity of 90% by weight or more, the content of alumina in the slurry is 20% by weight or more and 50% by weight or less, and the slurry has a viscosity of 0.5 Pa·s or more and 15 Pa·s or less: condition (a): the average particle diameter is 1 μm or less, condition (b): particles having a particle diameter of less than 0.2 μm account for 7% by weight or less, condition (c): particles having a particle diameter of more than 1.5 μm account for 15% by weight or less, and condition (d): one or more frequency maximums exist in a particle diameter range of 0.1 μm or more and less than 0.5 μm.

17 Claims, 1 Drawing Sheet

(51) Int. Cl.
*C01F 7/02* (2006.01)
*H01M 2/14* (2006.01)
*C08K 3/22* (2006.01)
*H01M 10/0525* (2010.01)

(52) U.S. Cl.
CPC ........... *H01M 2/145* (2013.01); *H01M 2/166* (2013.01); *H01M 2/1653* (2013.01); *H01M 2/1686* (2013.01); *C01P 2004/51* (2013.01); *C01P 2004/53* (2013.01); *C01P 2004/61* (2013.01); *C01P 2004/62* (2013.01); *C01P 2006/12* (2013.01); *C01P 2006/22* (2013.01); *C01P 2006/80* (2013.01); *C08K 2003/2227* (2013.01); *H01M 10/0525* (2013.01)

(56) References Cited

U.S. PATENT DOCUMENTS

| | | |
|---|---|---|
| 2007/0122716 A1 | 5/2007 | Seo |
| 2008/0038639 A1 | 2/2008 | Ohata et al. |
| 2009/0181300 A1 | 7/2009 | Kim |
| 2010/0203396 A1 | 8/2010 | Murata |
| 2011/0206963 A1 | 8/2011 | Fujita et al. |
| 2011/0223423 A1 | 9/2011 | Ozaki et al. |
| 2015/0004465 A1 | 1/2015 | Ozaki et al. |

FOREIGN PATENT DOCUMENTS

| | | |
|---|---|---|
| JP | 2005-327680 A | 11/2005 |
| JP | 2011-216257 A | 10/2011 |
| JP | 2012-4103 A | 1/2012 |
| WO | 2008/149986 A1 | 12/2008 |

OTHER PUBLICATIONS

Communication dated Jul. 4, 2016, issued by the State Intellectual Property Office of the P.R.C. in counterpart Chinese Application No. 201380039585.1.
International Preliminary Report on Patentability and Written Opinion dated Jan. 27, 2015 in International Application No. PCT/JP2013/070674.
International Search Report dated Oct. 15, 2013 in International Application No. PCT/JP2013/070674.

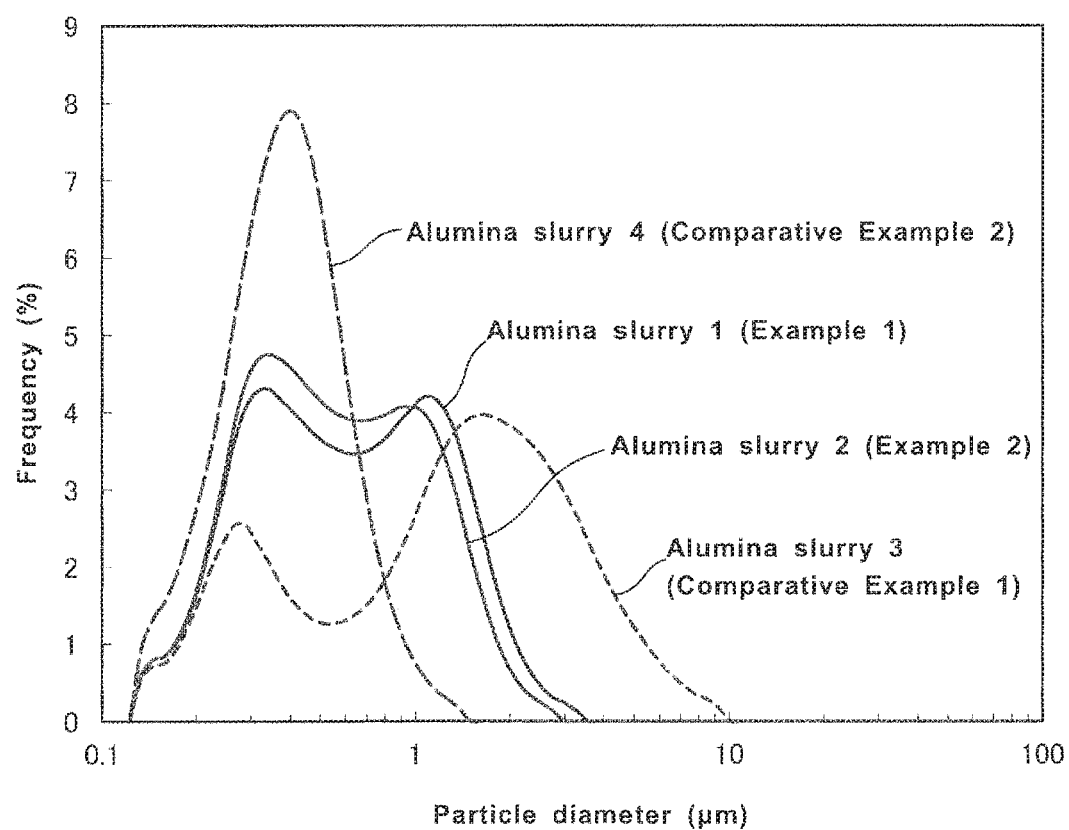

ALUMINA SLURRY, METHOD FOR PRODUCING SAME, AND COATING LIQUID

This a continuation of application Ser. No. 14/416,901, filed Jan. 23, 2015, which is a National Stage of International Application No. PCT/JP2013/070674, filed on Jul. 24, 2013, which claims priority from Japanese Patent Application No. 2012-167011, filed on Jul. 27, 2012, the contents of all of which are incorporated herein by reference in their entirety.

TECHNICAL FIELD

The present invention relates to an alumina slurry and a method for producing the same, and a coating liquid. More particularly, the present invention relates to an alumina slurry as a raw material of a coating liquid which is suited for formation of a heat-resistant layer in a laminated porous film including the heat-resistant layer and a polyolefin porous film laminated to each other, and a method for producing the same.

BACKGROUND ART

A nonaqueous electrolyte secondary battery, especially a lithium ion secondary battery, has widely been used as a battery which is used in personal computers, mobile phones, mobile information terminals, and the like, because of its high energy density.

The nonaqueous electrolyte secondary battery typified by a lithium ion secondary battery has high energy density, and a large current flows to intensely generate heat when inner short circuit and outer short circuit occur due to breakage of the battery or accidents such as breakage of devices using the battery. Therefore, there is a need for the nonaqueous electrolyte secondary battery to secure high safety by preventing excess heat generation.

Examples of such a method include a method in which a porous film made of a material, which melts at abnormal heat generation, is used as a separator.

As the separator, for example, a porous film containing polyolefin as a main component is used. The separator composed of a polyolefin porous film melts at about 80 to 180° C. and changes into a non-porous separator at abnormal heat generation of the battery, thereby to shutdown permeation of ions, thus suppressing further heat generation. However, when heat is intensely generated, the separator composed of the polyolefin porous film may undergo shrinkage or film rupture, leading to direct contact between positive and negative electrodes, thus causing short circuit. As mentioned above, the separator composed of the polyolefin porous film sometimes failed to suppress abnormal heat generation due to short circuit because of insufficient shape stability.

To cope with such a problem, some means have been proposed so as to improve shape stability at a high temperature of the separator. There has been proposed, as one of means, a separator composed of a laminated porous film including a porous film made mainly of polyolefin as a base material (hereinafter sometimes referred to as a "base material porous film") and a heat-resistant layer containing an alumina filler in the form of a fine powder laminated to each other (see, for example, Patent Document 1). Such a separator can suppress shape change of the whole separator since the heat-resistant layer containing the alumina filler composing the laminated porous film hardly undergoes shrinkage even at abnormal heat generation.

However, the separator composed of the laminated porous film including the heat-resistant layer sometimes causes falling-off of the filler from the heat-resistant layer on a surface thereof, so-called "powder falling". If powder falling occurs from the separator, expected physical properties of the separator do not appear, and also process defects such as contamination of devices with a powder fallen in the case of assembling into a battery. Therefore, there is a need to develop an alumina slurry capable of obtaining a heat-resistant layer which enables suppression of "powder falling".

Patent Document 1: JP 2004-227972 A

DISCLOSURE OF THE INVENTION

Problems to be Solved by the Invention

Under these circumstances, an object of the present invention is to provide an alumina slurry serving as a raw material of a coating liquid suited for formation of a heat-resistant layer, which suppresses powder falling in a separator for nonaqueous electrolyte secondary battery and also has chemical stability and shape stability at a high temperature, in an easy and stable manner. Another object of the present invention is to provide a method for producing the alumina slurry.

Means for Solving the Problem

Namely, the present invention includes the following inventions.

<1> An alumina slurry substantially including alpha-alumina particles and water, wherein the alpha-alumina particles satisfy all particle diameter distribution conditions (a) to (d) mentioned below, the alpha-alumina particles have an alumina purity of 90% by weight or more, the content of alumina in the slurry is 20% by weight or more and 50% by weight or less, and the slurry has a viscosity of 0.5 Pa·s or more and 15 Pa·s or less:

condition (a): the average particle diameter is 1 μm or less, condition (b): particles having a particle diameter of less than 0.2 μm account for 7% by weight or less, condition (c): particles having a particle diameter of more than 1.5 μm account for 15% by weight or less, and condition (d): one or more frequency maximums exist in a particle diameter range of 0.1 μm or more and less than 0.5 μm.

<2> The alumina slurry according to the above <1>, wherein the alpha-alumina particles further satisfy all particle diameter distribution conditions (e) to (g) mentioned below:

condition (e): particles having a particle diameter of 0.5 μm or more and less than 1 μm account for 40% by weight or less, condition (f): one or more frequency maximums exist in a particle diameter range of 1 μm or more, and condition (g): relations of expressions (1) and (2) below are satisfied:

$$2 \times D1 \leq D2 \leq 5 \times D1 \quad (1)$$

$$(M1/M2) \geq 0.8 \quad (2)$$

where

D1 denotes a maximum particle diameter of a frequency maximum showing the smallest maximum particle diameter among frequency maximums which appear in a particle diameter range of 0.1 µm or more and less than 0.5 µm in the condition (d), and M1 denotes a maximum value; and D2 denotes a maximum particle diameter of a frequency maximum showing the largest maximum particle diameter among frequency maximums which appear in a particle diameter range of 1 µm or more in the condition (f), and M2 denotes a maximum value.

<3> The alumina slurry according to the above <1> or <2>, wherein the amount of coarse particles having a particle diameter of 10 µm or more is 10 ppm or less in the alpha-alumina particles.

<4> The alumina slurry according to any one of the above <1> to <3>, wherein the content of Zr in the alumina solid component is 300 ppm or more calculated on a weight basis.

<5> A method for producing the alumina slurry according to any one of the above <1> to <4>, which includes adding raw alpha-alumina particles having an alumina purity of 90% by weight or more, a BET specific surface area of 15 $m^2/g$ or less, and an average particle diameter of 1 µm or more and 30 µm or less to water, which is a solvent, so that the content of alumina becomes 20% by weight or more and 50% by weight or less, thereby allowing the raw alpha-alumina particles to undergo wet grinding.

<6> The method for producing the alumina slurry according to the above <5>, wherein the wet grinding is performed in the absence of a dispersing agent.

<7> The method for producing the alumina slurry according to the above <5> or <6>, wherein the wet grinding is wet grinding by dispersion media and the dispersion media are $ZrO_2$ beads having a diameter of 0.65 mm to 1.5 mm.

<8> A coating liquid comprising a binder, alpha-alumina particles, and a solvent, which is used for formation of a heat-resistant layer in a separator for nonaqueous electrolyte secondary battery, including the heat-resistant layer containing alpha-alumina particles and a binder, and polyolefin porous film laminated to each other, wherein
the coating liquid is prepared by mixing the alumina slurry according to any one of the above <1> to <4> with a binder, and contains the alpha-alumina particles in the amount of 100 to 10,000 parts by weight based on 100 parts by weight of the binder.

Effects of the Invention

According to the present invention, there is provided an alumina slurry serving as a raw material of a coating liquid capable of producing a separator for nonaqueous electrolyte secondary battery, including a heat-resistant layer which suppresses powder falling and also has excellent shape stability, in a stable manner; and a coating liquid containing the alumina slurry.

BRIEF DESCRIPTION OF THE DRAWINGS

FIG. 1 shows particle diameter distribution of alumina particles in alumina slurries 1 to 4 (Examples 1 and 2, and Comparative Examples 1 and 2).

MODE FOR CARRYING OUT THE INVENTION

The present invention will be described in detail by way of illustrations, but the present invention is not limited to the following illustrations, and changes and modifications can be optionally made without departing from scope of the present invention.

The alumina slurry of the present invention is used as a raw slurry of a coating liquid which is used for formation of a layer B in a separator composed of a laminated porous film including a polyolefin base material porous film (hereinafter sometimes referred to as a "layer A") and a heat-resistant layer containing a binder and a filler composed of alumina particles (hereinafter sometimes referred to as a "layer B") laminated to each other.

Specifically, a coating liquid prepared by dissolving and dispersing the alumina slurry of the present invention in an appropriate solvent together with a binder is applied to one or both surfaces of a layer A and the solvent is removed, thereby to laminate the layer B on one or both surfaces of the layer A, thus forming the laminated porous film.

The layer A melts and changes into a non-porous layer at abnormal heat generation when accidents of a battery occur, thus imparting the shutdown function to the laminated porous film.

The layer B has heat resistance at a high temperature at which shutdown occurs, thus imparting the shape stability function to the laminated porous film.

The alumina slurry of the present invention will be described in detail below.

<Alumina Slurry>

The alumina slurry of the present invention is an alumina slurry substantially comprising alpha-alumina particles and water, and may include alpha-alumina particles and components other than water as long as the object of the present invention can be achieved.

Examples of components other than water include alcohols such as methanol, ethanol, n-propanol, isopropanol, n-butanol, isobutanol, and t-butanol, known dispersing agents, and the like.

As mentioned below, according to the production method of the present invention, the alumina slurry of the present invention can be obtained without using solvents other than water or a dispersing agent.

The alpha-alumina particles included in the alumina slurry of the present invention satisfy all particle diameter distribution conditions (a) to (d) mentioned below. Particle diameter distribution can be obtained by a laser diffraction method. Specific mention will be made below in Examples. The average particle diameter means a particle diameter equivalent to 50% cumulative percentage ($D_{50}$) on a mass basis.

Particle Diameter Distribution Conditions

Condition (a): the average particle diameter is 1 µm or less, and preferably 0.4 µm or more and 0.7 µm or less Condition (b): particles having a particle diameter of less than 0.2 µm account for 7% by weight or less, and preferably 5% by weight or less Condition (c): particles having a particle diameter of more than 1.5 µm account for 15% by weight or less, and preferably 10% by weight or less Condition (d): one or more frequency maximums, and preferably one frequency maximum, exist(s) in a particle diameter range of 0.1 µm or more and less than 0.5 µm.

It is also preferred that the alpha-alumina particles further satisfy all particle diameter distribution conditions (e) to (g) mentioned below.

Particle Diameter Distribution Conditions

Condition (e): particles having a particle diameter of 0.5 µm or more and less than 1 µm account for 40% by weight or less Condition (f): one or more frequency maximums exist in a particle diameter range of 1 µm or more Condition (g): relations of expressions (1) and (2) below are satisfied:

$$2 \times D1 \leq D2 \leq 5 \times D1 \quad (1)$$

$$(M1/M2) \geq 0.8 \quad (2)$$

where
D1 denotes a maximum particle diameter of a frequency maximum showing the smallest maximum particle diameter among frequency maximums which appear in a particle diameter range of 0.1 μm or more and less than 0.5 μm in the condition (d), and M1 denotes a maximum value; and D2 denotes a maximum particle diameter of a frequency maximum showing the largest maximum particle diameter among frequency maximums which appear in a particle diameter range of 1 μm or more in the condition (f), and M2 denotes a maximum value.

The alumina particles included in the alumina slurry of the present invention are alpha-alumina particles which are thermally and chemically excellent in stability. Therefore, the heat-resistant layer formed from the alumina slurry of the present invention is thermally and chemically excellent in stability. Alumina includes, in addition to alpha-alumina, beta-alumina, gamma-alumina, theta-alumina, and the like, which are easy to obtain a particulate material as compared with alpha-alumina. However, these alumina(s) other than alpha-alumina are thermally and chemically inferior in stability as compared with alpha-alumina and are therefore unsuited for formation of a heat-resistant layer.

The alpha-alumina particles according to the present invention has an alumina purity of 90% by weight or more, preferably 99% by weight or more, more preferably 99.9% by weight or more, and most preferably 99.99% by weight or more. It is not preferred that the alumina purity of the alpha-alumina particles is less than 90% by weight since the contents of impurities such as Si, Na, and Fe included in the alpha-alumina powder increase, thus failing to obtain satisfactory electrical insulation properties, and increasing amount of metallic foreign substances which cause short circuit.

Here, the alumina purity can be determined by a solid-state emission spectrometry. Specific mention will be made below in Examples.

The content of alumina in the alumina slurry of the present invention is 20% by weight or more and 50% by weight or less, and preferably 20% by weight or more 40% by weight or less. If the content of alumina is less than 20% by weight, the concentration of alumina of the coating liquid decreases, and thus drying after coating requires energy. If the concentration is more than 50% by weight, the viscosity of the slurry excessively increases, leading to deterioration of grinding efficiency such as a decrease in liquid feed speed of the slurry.

The alumina slurry of the present invention preferably has a viscosity within a range of 0.5 Pa·s or more 15 Pa·s or less, and more preferably 1.0 Pa·s or more 4.0 Pa·s or less. The viscosity of the slurry is the value determined by a B-type viscometer. Specific mention will be made below in Examples.

Regarding alpha-alumina particles in the alumina slurry of the present invention, the amount of coarse particles having a particle diameter of 10 μm or more is preferably 10 ppm or less, and more preferably 3 ppm or less.

If coarse particles having a particle diameter of 10 μm or more is included in the amount of more than 10 ppm, defects such as streaks or coarse voids due to aggregation particles are sometimes partially generated. The amount of coarse particles can be determined by a wet sieving method disclosed in the below-mentioned Examples.

The content of Zr in the alumina solid component is preferably 300 ppm or more, and more preferably 500 ppm or more, calculated on a weight basis. The upper limit of the content of Zr is preferably 1,500 ppm or less calculated on a weight basis.

The content of Zr in the alumina solid component can be measured by ICP atomic emission spectroscopy disclosed in the below-mentioned Examples.

<Method for Producing Alumina Slurry>

There is no particular limitation on the production method of the above-mentioned alumina slurry of the present invention as long as the obtained alumina slurry has physical properties mentioned above. For example, an alpha-alumina powder satisfying the alumina purity and the particle size distribution is preferably dispersed in a predetermined amount of water and the adjustment is made so as to satisfy the slurry viscosity.

Meanwhile, alumina particles included in the alumina slurry of the present invention sometimes aggregate during storage to form an aggregate. When the slurry contains large aggregate, film defects are generated in the layer B due to deterioration of coatability, thus resulting in deterioration of film properties such as shutdown properties of a separator and ion permeability (air permeability). Therefore, fine alumina particles are hardly dispersed in water, thus substantially requiring a dispersing agent, in addition to water.

To cope with such a problem, if predetermined alpha-alumina particles undergo wet grinding, the alumina slurry of the present invention satisfying the above particle diameter distribution can be obtained without using the dispersing agent, using only water as a solvent.

Namely, the method for producing an alumina slurry of the present invention (hereinafter referred to as "production method of the present invention") includes adding raw alpha-alumina particles having an alumina purity of 90% by weight or more, a BET specific surface area of 15 m$^2$/g or less, and an average particle diameter of 1 μm or more and 30 μm or less to water, which is a solvent, so that the content of alumina becomes 20% by weight or more and 50% by weight or less, thereby allowing the raw alpha-alumina particles to undergo wet grinding.

The production method of the present invention has such an advantage that since alpha-alumina can be directly dispersed in a water solvent by wet grinding of comparatively coarse raw alpha-alumina particles mentioned above in the water solvent, the alumina slurry of the present invention exhibiting the above physical properties can be obtained even if wet grinding is performed in the absence of a dispersing agent.

The production method of the present invention will be described in more detail below.

(Raw Alpha-Alumina Particles)

A description will be made of alpha-alumina particles serving as a raw material (hereinafter referred to as "raw alpha-alumina particles") in the production method of the present invention.

The raw alpha-alumina particles have an alumina purity of 90% by weight or more, preferably 99% by weight or more, more preferably 99.9% by weight or more, and most preferably 99.99% by weight or more. The alumina purity can be determined by solid-state emission spectrometry.

The raw alpha-alumina particles have a BET specific surface area of 15 m$^2$/g or less, and preferably 10 m$^2$/g or less.

The average particle diameter of raw alpha-alumina particles is 1 μm or more and 30 μm or less, and preferably 1 μm or more 20 μm or less. The average particle diameter of raw alpha-alumina particles can be determined by a laser diffraction method.

(Wet Grinding of Raw Alpha-Alumina Particles)

In the production method of the present invention, the above raw alpha-alumina particles are added to water which is a solvent, thereby allowing the raw alpha-alumina particles to undergo wet grinding.

The amount of raw alpha-alumina particles to be added is decided so that the viscosity of the slurry after wet grinding becomes 0.5 Pa·s or more and 15 Pa·s or less, and the content of alumina is 20% by weight or more and 50% by weight or less when the total of the raw alpha-alumina particles and the water solvent is 100% by weight.

It is possible to use, as a wet grinder used in wet grinding, conventionally known dispersers such as a homogenizer, a media-type dispenser, and a pressure-type dispenser. Of these wet grinders, a media-type dispenser is preferable, and specific examples thereof include a tower mill, a pearl mill, a sand mill, a dyno-mill, an ultra visco mill, an atriter, an annular mill, and the like.

As dispersion media, alumina beads and zirconia ($ZrO_2$) beads are used, and $ZrO_2$ beads having a diameter of 0.65 mm to 1.5 mm are preferable in view of large specific gravity, and excellent abrasion resistance and grindability.

Wet grinding conditions are not primarily determined by devices, dispersion media, and the like to be used, and appropriate grinding conditions may be decided by performing a preliminary test. Specifically, the amount of dispersion media accounts for 30% by volume to 90% by volume of a grinder capacity, and the retention time is usually within a range of about 2 to 10 minutes under the conditions that the content of alumina is 20% by weight or more and 50% by weight or less.

<Method for Preparing Coating Liquid>

The alumina slurry of the present invention is used as a coating liquid containing a binder, alpha-alumina particles, and a solvent, which is used for formation of a heat-resistant layer in a separator for nonaqueous electrolyte secondary battery, including the heat-resistant layer containing a filler composed of alpha-alumina particles (hereinafter sometimes simply referred to as a "filler") and a binder, and a polyolefin base material porous film laminated to each other, by mixing it with a binder and a solvent.

As mentioned above, the coating liquid can be obtained by mixing and dispersing the alumina slurry of the present invention with the binder and the solvent until the mixture becomes uniform, and used for formation of a heat-resistant layer (layer B) of a laminated porous film.

There is no particular limitation on the method for mixing an alumina slurry, a binder, and a solvent, and it is possible to use conventionally known dispersers, for example, a stirring-type emulsifying device, a three-one motor, a homogenizer, a media-type dispenser, a pressure-type dispenser, and the like.

It is possible to use, as the solvent used in the preparation of the coating liquid, water, an organic solvent such as methanol, ethanol, n-propanol, isopropanol, n-butanol, isobutanol, t-butanol, acetone, ethyl methyl ketone, N-methylpyrrolidone, dimethyl sulfoxide, or N,N-dimethylformamide, or a mixed solvent of water and an organic solvent.

The binder to be selected is a binder which has a property capable of binding a filler composed of alumina particles and bonding with a layer A, and is also dissolved or dispersed in the solvent. A water-soluble polymer is preferably used since an aqueous coating liquid can be prepared.

The water-soluble polymer preferably has a hydrophilic functional group. It is possible to preferably use, as the material having the hydrophilic functional group, carboxymethyl cellulose, alkyl cellulose, hydroxyalkyl cellulose, starch, polyvinyl alcohol, and sodium alginate because of high adhesion to the layer A. Salts thereof may also be used.

In the coating liquid of the present invention, the amount of the alumina slurry (calculated in terms of the solid component) is within a range of 100 to 10,000 parts by weight, and preferably 1,000 to 5,000 parts by weight, based on 100 parts by weight of the binder. Too small amount of the filler leads to insufficient ion permeability, while too large amount of the filler leads to an increase in the amount of powder falling.

In the coating liquid of the present invention, the concentration of the filler is preferably within a range of 6 to 50% by weight, and more preferably 10 to 40% by weight.

In the coating liquid of the present invention, the concentration of the binder is preferably 0.30% by weight or more and 2.0% by weight or less, and more preferably 0.40% by weight or more and 1.5% by weight or less, based on the weights of the binder and the solvent. It is preferred to use a binder whose molecular weight is appropriately selected so as to obtain the viscosity suited for coating.

It is possible to add a surfactant, a pH adjustor, a dispersing agent, a plasticizer, and the like to the coating liquid as long as the object of the present invention is not impaired.

<Formation of Heat-Resistant Layer>

The coating liquid of the present invention obtained by the above method is applied to one or both surfaces of a base material porous film (layer A) and the solvent is removed, thus enabling formation of a heat-resistant layer containing a filler and a binder.

The layer A is a porous film of polyolefin, and is not dissolved in an electrolytic solution in a nonaqueous secondary battery. The layer preferably contains a high molecular weight component having a weight average molecular weight of $5 \times 10^5$ to $15 \times 10^6$. Examples of the polyolefin include high molecular weight homopolymers or copolymers obtained by polymerizing ethylene, propylene, 1-butene, 4-methyl-1-pentene, 1-hexene, and the like. Of these, a high molecular weight polyethylene composed mainly of ethylene is preferable.

The porosity of the layer A is preferably within a range of 20 to 80% by volume, and more preferably 30 to 70% by volume. The porosity of less than 20% by volume may lead to a decrease in electrolytic solution holding amount. Meanwhile, the porosity of more than 80% by volume may lead to insufficient change into a non-porous layer at a high temperature at which shutdown arises, in other words, it may become impossible to cut off a current when a batter generates heat due to accidents.

The thickness of the layer A is usually within a range of 4 to 50 μm, and preferably 5 to 30 μm. The thickness of less than 4 μm may leads to insufficient shutdown, while the thickness of more than 50 μm may lead to an increase in thickness of a laminated porous film, thus resulting in reduction of a capacitance of a battery.

The pore diameter of the layer A is preferably 3 μm or less, and more preferably 1 μm or less.

The layer A is a structure including connected pores therein, and enables a gas or a liquid to permeate from one face to the other face. The light transmittance (air permeability) is usually represented by the Gurley value. The Gurley value of the laminated porous film of the present invention is preferably within a range of 30 to 400 seconds/100 cc, and more preferably 50 to 300 seconds/100 cc.

There is no particular limitation on the method for producing a layer A, and examples thereof include a method as disclosed in JP 7-29563 A in which a plasticizer is added to a thermoplastic resin and a film is formed, and then the plasticizer is removed by an appropriate solvent, and a method as disclosed in JP 7-304110 A in which, using a film made of a thermoplastic resin produced by a known method, the structurally weak amorphous portion of the film is selectively stretched to form micropores. For example, when the layer A is formed from a polyolefin resin including an ultra-high molecular weight polyethylene and a low molecular weight polyolefin having a weight average molecular weight 10,000 or less, the layer is preferably produced by the method mentioned below from the viewpoint of production costs.

Namely, the method is a method including the steps of:
(1) kneading 100 parts by weight of an ultra-high molecular weight polyethylene, 5 to 200 parts by weight of a low molecular weight polyolefin having a weight average molecular weight 10,000 or less, and 100 to 400 parts by weight of an inorganic filler such as calcium carbonate to obtain a polyolefin resin composition,
(2) forming a sheet using the polyolefin resin composition,
(3) removing an inorganic filler from the sheet obtained in the step (2), and
(4) stretching the sheet obtained in the step (3) to obtain a layer A; or a method including the steps of:
(1) kneading 100 parts by weight of an ultra-high molecular weight polyethylene, 5 to 200 parts by weight of a low molecular weight polyolefin having a weight average molecular weight 10,000 or less, and 100 to 400 parts by weight of an inorganic filler to obtain a polyolefin resin composition,
(2) forming a sheet using the polyolefin resin composition,
(3) removing an inorganic filler from the sheet obtained in the step (2), and
(4) stretching the sheet obtained in the step (3) to obtain a layer A.

It is possible to use, as the layer A, commercially available products having the above-mentioned properties.

There is no particular limitation on the method for applying the coating liquid of the present invention to a layer A, as long as it is a method capable of performing uniform wet coating, and a conventionally known method can be employed. It is possible to employ, for example, a capillary coating method, a spin coating method, a slit die coating method, a spray coating method, a dip coating method, a roll coating method, a screen printing method, a flexographic printing method, a bar coater method, a gravure coater method, a die coater method, and the like. The thickness of the layer B can be controlled by adjusting the thickness of a coating film, the concentration of a binder in a coating liquid, and the ratio of a filler to a binder.

It is possible to use, as a support, a film made of a resin, a belt made of metal, a drum, and the like.

The method for removing a solvent is commonly a method by drying. When the coating liquid is applied on the layer A, the drying temperature of the solvent is preferably the temperature which does not cause deterioration of air permeability of the layer A.

Using the above method, a heat-resistant layer (layer B) is formed on the layer A.

The thickness of the layer B is usually within a range of 0.1 µm or more and 20 µm or less, and preferably 1 µm or more and 15 µm or less. Too thick layer B may lead to an increase in thickness of a laminated porous film including the layer A, thus resulting in reduction of a capacitance of a battery. Too thin layer B may lead to shrinkage of a laminated porous film since it is impossible to resist heat shrinkage of a porous film (layer A) of polyolefin when a batter generates heat due to accidents.

When the layer B is formed to both surfaces of the layer A, the thickness of the layer B is the total thickness of both surfaces.

The layer B is a porous film in which fillers are connected by a binder, and pores formed in the space between fillers are connected to each other, thus enabling a gas or a liquid to permeate from one face to the other face.

The pore diameter of the pore is preferably 3 µm or less, and more preferably 1 µm or less, in terms of an average of a diameter of a sphere in the case of approximating the pore by a spherical shape. The size of an average of the pore diameter of more than 3 µm may cause a problem that short circuit is likely to occur when carbon powders or small pieces thereof, which are main components of positive and negative electrodes, fall off.

The porosity of the layer B is preferably within a range of 30 to 65% by volume, and more preferably 40 to 60% by volume.

Weak peel strength of the layer B may cause a problem that powder falling occurs when the film is wound. The powder falling ratio of the layer B is preferably 30% or less, and more preferably 25% or less.

<Laminated Porous Film>

The laminated porous film of the present invention includes a layer A and a layer B formed on the layer B by the above-mentioned method. Namely, the coating liquid of the present invention is applied to one or both surfaces of a base material porous film (layer A) and then a solvent is removed to obtain a laminated porous film of the present invention in which a heat-resistant layer (layer B) containing alpha-alumina particles and a binder is formed on one or both surfaces of the base material porous film (layer A). The laminated porous film of the present invention can be used as a separator for nonaqueous electrolyte secondary battery.

The total thickness of the laminated porous film of the present invention, i.e. total thickness of the layer A and the layer B, is usually within a range of 5 to 80 µm, preferably 5 to 50 µm, and particularly preferably 6 to 35 µm. The total thickness of the laminated porous film is less than 5 µm, film rupture is likely to occur. Meanwhile, the total thickness of more than 80 µm may lead to an increase in thickness of the laminated porous film, thus resulting in reduction of a capacitance of a battery.

The total porosity of the laminated porous film of the present invention is usually within a range of 30 to 85%, and preferably 40 to 80%.

When a nonaqueous secondary battery is produced using the laminated porous film of the present invention, high load characteristics are obtained, and air permeability of the laminated porous film is preferably within a range of 50 to 2,000 seconds/100 cc, more preferably 50 to 1,000 seconds/100 cc, and still more preferably 50 to 300 seconds/100 cc. The air permeability of 2,000 seconds/100 cc or more may lead to deterioration of ion permeability of the laminated porous film and load characteristics of the battery.

Regarding the size retention rate of the laminated porous film at a high temperature at which shutdown arises, smaller value of those in MD direction or TD direction of the layer A is 85% or more, preferably 90% or more, and more preferably 95% or more. Here, the MD direction means a longitudinal direction during film forming, and the TD direction means a width direction during film forming. The size retention rate of less than 85% may cause short circuit between positive and negative electrodes due to heat shrinkage of the laminated porous film at a high temperature at which shutdown arises, thus resulting in insufficient shutdown function. High temperature, at which shutdown arises, is the temperature within a range of 80 to 180° C. and is usually within a range of about 130 to 160° C.

In the laminated porous film of the present invention, the laminated porous film of the present invention may include films other than the layer A and the layer B, for example, porous films such as an adhesive film and a protective film, as long as the object of the present invention is not impaired.

When a nonaqueous electrolyte secondary battery is produced using a laminated porous film of the present invention as a separator, the nonaqueous electrolyte secondary battery has high load characteristics, and also the separator exerts the shutdown function even if the battery intensely generates heat due to accidents, leading to avoidance of contact between positive and negative electrodes due to shrinkage of the separator, and thus a high-safety nonaqueous electrolyte secondary battery is obtained.

EXAMPLES

The present invention will be described more specifically below by way of Examples, but the present invention is not limited thereto.

The respective physical properties were measured by the following procedures.

(Alumina Purity)

Alumina purity used was determined by subtracting the sum total (%) of the weights of $SiO_2$, $Na_2O$, MgO, CuO, and $Fe_2O_3$ included in an oxide (alpha-alumina) serving as a standard from 100. The calculation equation is as follows. The content of each of Si, Na, Mg, Cu, and Fe was measured by solid-state emission spectrometry.

Alumina purity (% by weight)=100−sum total (% by weight) of weights of impurities (BET Specific Surface Area)

BET specific surface area of alumina particles was determined by a nitrogen adsorption method in accordance with the method defined in JIS-Z-8830. "FlowSorb II 2300" manufactured by Shimadzu Corporation was used as a specific surface area analyzer.

(Particle Diameter Distribution and Average Particle Diameter of Alumina Particles)

Using a laser particle size distribution analyzer ["Microtrac: MT-3300EX II", manufactured by Nikkiso Co., Ltd.], particle diameter distribution on a mass standard of alumina particles was determined by a laser diffraction method. A particle diameter equivalent to 50% cumulative percentage by mass was regarded as an average particle diameter. The measurement was made by ultrasonic dispersion of a sample in an aqueous 0.2% by weight sodium hexametaphosphate solution.

(Zr Content)

The content of Zr in the alumina solid component was determined by evaporating an alumina slurry to dryness at 200° C., followed by measurement using ICP emission spectroscopy.

(Content of Coarse Particles having Particle Diameter of 10 or more)

An alumina slurry (100 g) was dispersed in 4 L of pure water containing 0.2% sodium hexametaphosphate as a dispersing agent by irradiation with ultrasonic wave, and the slurry was passed through a sieve with 10 µm mesh size. The alumina powder remaining on the sieve and then the content was measured.

Content of coarse particles (ppm)=weight of residual alumina powder/weight of alumina slurry solid component (Viscosity)

Using a B-type viscometer ("TVB10M", manufactured by TOKI SANGYO CO., LTD.), a rotor No. 3 was rotated at 6 rpm to measure a viscosity of an alumina slurry.

Physical properties of a separator were measured by the following procedures.

(1) Measurement of Thickness (Unit: µm)

The thickness of the separator was measured by a high-accuracy micrometer manufactured by Mitutoyo Corporation.

(2) Basis Weight (Unit: $g/m^2$)

The separator was cut into a tetragon having a side length of 8 cm and then the weight W (g) was measured. The Basis weight was measured by the following equation:

Basis weight $(g/m^2)$=W/(0.08×0.08). The basis weight of a layer B was calculated by subtracting a basis weight of a porous base material (layer A) from a basis weight of a laminated porous film.

(3) Porosity

A film was cut into a tetragon having a side length of 8 cm, and the weight W (g) and the thickness D (cm) were measured. The weight of each of materials in a sample was determined by calculation and the weight Wi (g) of each material was divided by a true specific gravity to calculate the volume of each material, and then the porosity (% by volume) was determined by the following equation. The basis weight of each material was calculated by the amount used in film formation and the proportion Porosity (% by volume)=100−[{($W1$/true specific gravity 1)+($W2$/true specific gravity 2)+ . . . +($Wn$/true specific gravity $n$)}/(100×$D$)]×100

(4) Air Permeability

In accordance with JIS P8117, air permeability was measured by a digital timer-type Gurley densometer manufactured by Toyo Seiki Seisaku-Sho, Ltd.

(5) Heat Shape Retention Ratio

A film was cut into pieces measuring 8 cm×8 cm and each film piece, on which a tetragon measuring 6 cm×6 cm was drawn, was interposed between papers, followed by putting in an oven heated at 150° C. After one hour, the film was taken out from the oven and the size of the side of the tetragon drawn on the film was measured, and then a heat shape retention ratio was calculated. The calculation method is as follows.

Length of line drawn in MD direction before heating: L1
Length of line drawn in TD direction before heating: L2
Length of line drawn in MD direction after heating: L3
Length of line drawn in TD direction after heating: L4

MD heat shape retention ratio (%)=($L3/L1$)×100

TD heat shape retention ratio (%)=($L4/L2$)×100

(6) Powder Falling Rate

Using a reciprocating abrasion tester (manufactured by Shinto Scientific Co., Ltd., TRIBOGEAR TYPE: 30), the measurement was ma de. A white cotton cloth (Kanakin No. 3) was pressed against a film with the weight $W_0$ (g) under a load of 100 $g/m^2$ (contact area of 16 mmφ). After reciprocating 100 times at a width of 5 cm, the weight W (g) of the film was measured to determine the amount of powder falling (g/m²). A powder falling ratio was calculated by the following equation.

Powder falling ratio (%)=amount of powder falling (g/m²)/basis weight (g/m²)×100

(7) Surface Smoothness

Surface smoothness was evaluated by observing SEM images of the film surface. Evaluation criteria are as follows.

A: Surface has high smoothness and unevenness is scarcely observed.

B: Area with unevenness is partially observed.

C: Unevenness is observed in the whole film.

Example 1

(Production of Alumina Slurry 1)

Alumina particles having a BET specific surface area of 4.1 m²/g and an average particle diameter of 6.2 μm were added to water so that the concentration of alumina became 30% by weight while stirring the alumina particles to obtain an alumina-water suspension. Subsequently, using Dyno-Mill (KDL-PILOT A model) manufactured by AG MASCHINENFABRIK BASEL, dispersion was performed under wet grinding conditions (circumferential speed: 10 m/second, material of beads: $ZrO_2$, diameter of beads: 1.0 mm, filling ratio of beads: 85% by volume, flow rate: 0.5 L/minute, and retention time: 4.4 minutes) in a path system to obtain an alumina slurry 1.

In the alumina slurry 1, a viscosity was 2.75 Pa·s, alumina particles included had an average particle diameter of 0.57 μm, and the amount of coarse particles of 10 μm or more was 3 ppm or less. The alumina slurry 1 was evaporated to dryness. As a result, the thus measured content of Zr in solid alumina was 1,010 ppm calculated on a weight basis.

As is apparent from particle diameter distribution of alumina particles in the alumina slurry 1 shown in FIG. 1, alumina particles in the alumina slurry 1 were alumina particles, wherein particles having a particle diameter of less than 0.2 μm accounts for 4.6% by weight, particles having a particle diameter of more than 1.5 μm accounts for 8.3% by weight, one frequency maximum exists in a particle diameter range of 0.1 μm or more and less than 0.5 μm, particles having a particle diameter of 0.5 μm or more and less than 1 μm accounts for 29.2% by weight, one frequency maximum appears in a particle diameter range of 1 μm or more, D1 is 0.34 μm, D2 is 1.06 μm, M1 is 4.30, and M2 is 4.19, and a ratio of M1 to M2 (M1/M2) is 1.03. An alumina slurry 1 and physical properties of alumina particles in the alumina slurry 1 are collectively shown in Table 1.

(Production and Evaluation of Separator)

A separator for evaluation, composed of a laminated porous film including a base material porous film (layer A) and a heat-resistant layer (layer B) laminated to each other was produced by the following method as the separator for evaluation. The layer A was formed by the following method.

<Method for Forming Layer A>

After mixing 70% by weight of an ultra-high molecular weight polyethylene powder (340M, manufactured by Mitsui Chemicals, Inc.) with 30% by weight of a polyethylene wax having a weight average molecular weight of 1,000 (FNP-0115, manufactured by Nippon Seiro Co., Ltd.), 0.4 part by weight of an antioxidant (Irg1010, manufactured by Ciba Specialty Chemicals Inc.), 0.1 part by weigh of an antioxidant (P168, manufactured by Ciba Specialty Chemicals Inc.), and 1.3 parts by weight of sodium stearate were added based on 100 parts by weight of the total amount of the ultra-high molecular weight polyethylene and the polyethylene wax, and then calcium carbonate having an average particle diameter of 0.1 μm (manufactured by Maruo Calcium Co., Ltd.) was added so that the proportion became 38% by volume based on the total volume. After mixing in the form of a powder using a Henschel mixer, the obtained powder mixture was melt-kneaded by a twin-screw extruder to obtain a polyolefin resin composition. The polyolefin resin composition was rolled by a pair of rolls at a surface temperature of 150° C. to form a sheet. This sheet was immersed in an aqueous hydrochloric acid solution (hydrochloric acid of 4 mol/L, nonionic surfactant of 0.5% by weight) to dissolve calcium carbonate, followed by removal calcium carbonate. Subsequently, the sheet was stretched six times at 105° C. to obtain a base material porous film A1 (film thickness: 16.1 μm, basis weight: 7.0 g/m², air permeability: 129 seconds/100 cc).

(1) Preparation of Coating Liquid for Forming Layer B

Using the alumina slurry 1 of Example 1, mixing was performed in accordance with such formulation that the amount of carboxymethyl cellulose (CMC, Dai-ichi Kogyo Seiyaku Co., Ltd. SORGEN 3H) became 2.9 parts by weight, the amount of pure water became 312 parts by weight, and the amount of ethanol became 156 parts by weight based on 100 parts by weight of alumina, (alumina solid component: 17.5% by weight). After ultrasonic dispersion for 10 minute and further circulation-type dispersion using Creamix ("CLM-0.8S, manufactured by M Technique Co., Ltd.") so that the retention time became 10 minutes, the thus obtained dispersion was filtered through a polyethylene net with 10 μm mesh size to prepare a coating liquid 1.

(2) Production and Evaluation of Separator for Evaluation

Using a bar coater (Bar No. 16), the coating liquid 1 was applied on a layer A and dried. The coating liquid 1 was applied on the other surface of the layer A in the same manner and dried, and then a layer B was laminated on both surfaces of the layer A to produce a separator 1 of Example 1. The thickness of the layer B is the total thickness of the layer B provided on both surfaces.

The layer B formed in the separator 1 exhibited a porosity of 49% by volume, an air permeability of 189 seconds/100 cc, an MD heat shape retention ratio of 98%, an MD heat shape retention ratio of 98%, sufficient porosity and air permeability to permeation of lithium ions, and also had low powder falling rate and high heat resistance.

Physical properties of the separator 1 obtained by the above method are shown in Table 2.

Example 2

Using the same operation as in Example 1, except that wet grin ding conditions were changed as follows: circumferential speed: 10 m/second, material of beads: $ZrO_2$, diameter of beads: 1.0 mm, fill ing ratio of beads: 85% by volume, flow rate: 0.5 L/minute, and retention time: 5.8 minutes, an alumina slurry 2 of Example 2 was produced. In the thus obtained alumina slurry 2, a viscosity was 3.04 Pa·s, alumina particles included had an average particle diameter of 0.52 μm, and the amount of coarse particles of 10 μm or more was 3 ppm or less. The alumina slurry was evaporated to dryness. As a result, the thus measured content of Zr in solid alumina was 1.270 ppm calculated on a weight basis.

As is apparent from particle diameter distribution of alumina particles in the alumina slurry 2 shown in FIG. 1, alumina particles in the alumina slurry 2 were alumina particles, wherein particles having a particle diameter of less than 0.2 μm accounts for 4.6% by weight, particles having a particle diameter of more than 1.5 μm accounts for 4.7% by weight, one frequency maximum exists in a particle diameter range of 0.1 μm or more and less than 0.5 μm, particles having a particle diameter of 0.5 μm or more and less than 1 μm accounts for 31.8% by weight, one frequency maximum appears in a particle diameter range of 1 μm or more, D1 is 0.34 μm, D2 is 0.97 μm, M1 is 4.75, and M2 is 4.07, and a ratio of M1 to M2 (M1/M2) is 1.17.

An alumina slurry 2 obtained by the above method and physical properties of alumina particles in the alumina slurry 2 are collectively shown in Table 1

Using the same operation as in Example 1, except that the alumina slurry 2 was used in place of the alumina slurry 1, a coating liquid 2 and a separator 2 of Example 2 were obtained. In the same manner as in Example 1, a base material porous film A1 was used as the layer A.

The layer B formed in the separator 2 exhibited a porosity of 40% by volume, an air permeability of 202 seconds/100 cc, an MD heat shape retention ratio of 98%, an MD heat shape retention ratio of 98%, sufficient porosity and air permeability to permeation of lithium ions, and also had low powder falling rate and high heat resistance.

Physical properties of the obtained separator 2 are shown in Table 2.

Comparative Example 1

Using the same operation as in Example 1, except that wet grinding conditions were changed as follows: circumferential speed: 10 m/second, material of beads: $ZrO_2$, diameter of beads: 1.0 mm, filling ratio of beads: 85% by volume, flow rate: 0.5 L/minute, and retention time: 1.5 minutes, an alumina slurry 3 of Comparative Example 1 was produced. In the thus obtained alumina slurry 3, a viscosity was 1.74 Pa·s, alumina particles included had an average particle diameter of 1.30 μm, and the amount of coarse particles of 10 μm or more was 3,531 ppm or less, and the content of coarse particles in the slurry was large. The alumina slurry 3 was evaporated to dryness. As a result, the thus measured content of Zr in solid alumina was 340 ppm calculated on a weight basis.

As is apparent from particle diameter distribution of alumina particles in the alumina slurry 3 shown in FIG. 1, alumina particles in the alumina slurry 3 were alumina particles, wherein particles having a particle diameter of less than 0.2 μm accounts for 4.1% by weight, particles having a particle diameter of more than 1.5 μm accounts for 43.7% by weight, one frequency maximum exists in a particle diameter range of 0.1 μm or more and less than 0.5 μm, particles having a particle diameter of 0.5 μm or more and less than 1 μm accounts for 13.6% by weight, one frequency maximum appears in a particle diameter range of 1 μm or more, D1 is 0.29 μm, D2 is 1.64 μm, M1 is 2.54, and M2 is 3.97, and a ratio of M1 to M2 (M1/M2) is 0.64.

An alumina slurry 3 obtained by the above method and physical properties of alumina particles in the alumina slurry 3 are shown in Table 1

Using the same operation as in Example 2, except that the alumina slurry 3 was used, a coating liquid 3 and a separator 3 of Comparative Example 1 were obtained. In the same manner as in Example 1, a base material porous film A1 was used as the layer A.

The layer B formed in the separator 3 exhibited a porosity of 68% by volume, an air permeability of 189 seconds/100 cc, an MD heat shape retention ratio of 97%, an MD heat shape retention ratio of 96%. Physical properties of the obtained separator 3 are collectively shown in Table 2. Since the proportion of coarse particles in the alumina slurry was large, porosity excessively increased. As a result of SEM image observation, surface unevenness was large, and also the powder falling rate was 31% and the coating film strength was low.

Comparative Example 2

Using the same operation as in Example 1, except that wet grinding conditions were changed as follows: circumferential speed: 10 m/second, material of beads: $ZrO_2$, diameter of beads: 0.3 mm, filling ratio of beads: 85% by volume, flow rate: 0.5 L/minute, and retention time: 4.4 minutes, an alumina slurry 4 of Comparative Example 2 was produced. In the thus obtained alumina slurry 4, a viscosity was 4.60 Pa·s, alumina particles included had an average particle diameter of 0.37 μm, and the amount of coarse particles of 10 μm or more was 3 ppm or less. The alumina slurry 4 was evaporated to dryness. As a result, the thus measured content of Zr in solid alumina was 2,000 ppm calculated on a weight basis.

As is apparent from particle diameter distribution of alumina particles in the alumina slurry 4 shown in FIG. 1, alumina particles in the alumina slurry 4 were alumina particles, wherein particles having a particle diameter of less than 0.2 μm accounts for 8.0% by weight, particles having a particle diameter of more than 1.5 μm accounts for 0% by weight, one frequency maximum exists in a particle diameter range of 0.1 μm or more and less than 0.5 μm, and particles having a particle diameter of 0.5 μm or more and less than 1 μm accounts for 24.3% by weight. However, a frequency maximum was not recognized in a particle diameter range of 1 μm or more.

An alumina slurry 4 obtained by the above method and physical properties of alumina particles in the alumina slurry 4 are collectively shown in Table 1

Using the same operation as in Example 2, except that the alumina slurry 4 was used, a coating liquid 4 and a separator 4 of Comparative Example 2 were obtained. In the same manner as in Example 1, a base material porous film A1 was used as the layer A.

The layer B formed in the separator 4 exhibited a porosity of 29% by volume, an air permeability of 190 seconds/100 cc, an MD heat shape retention ratio of 99%, an MD heat shape retention ratio of 99%. Regardless of having high heat resistance, sufficient porosity to permeation of lithium ions was not obtained.

Physical properties of the obtained separator 4 are shown in Table 2.

TABLE 1

|  | Alumina slurry | Viscosity [Pa · s] | Average particle diameter [μm] | Amount of coarse particles of 10 μm or more [ppm] | Zr Content [ppm] | Particles of less than 0.2 μm [wt %] | Particles of more than 1.5 μm [wt %] | Particles of more than 0.5 μm and less than 1 μm [wt %] | D1 [μm] | D2 [μm] | M1 | M2 | M/M2 |
|---|---|---|---|---|---|---|---|---|---|---|---|---|---|
| Example 1 | Slurry 1 | 2.75 | 0.57 | 3 or less | 1,010 | 4.6 | 8.3 | 29.2 | 0.34 | 1.06 | 4.3 | 4.19 | 1.03 |
| Example 2 | Slurry 2 | 3.04 | 0.52 | 3 or less | 1,270 | 4.6 | 4.7 | 31.8 | 0.34 | 0.97 | 4.75 | 4.07 | 1.17 |
| Comparative Example 1 | Slurry 3 | 1.74 | 1.3 | 3,531 | 340 | 4.1 | 43.7 | 13.6 | 0.29 | 1.64 | 2.54 | 3.97 | 0.64 |
| Comparative Example 2 | Slurry 4 | 4.6 | 0.37 | 3 or less | 2,000 | 8.0 | 0 | 24.3 | 0.41 | — | 7.89 | — | — |

TABLE 2

|  | Separator | Heat-resistant layer (Layer B) | | | Air permeability (Gurley) [seconds/100 cc] | Powder falling ratio [%] | Surface smoothness | Heat shape retention ratio [%] | |
|---|---|---|---|---|---|---|---|---|---|
|  |  | Thickness [μm] | Basis weight [g/m²] | Porosity [vol %] |  |  |  | MD | TD |
| Example 1 | Separator 1 | 5.8 | 10.6 | 49 | 189 | 25 | A | 98 | 98 |
| Example 2 | Separator 2 | 4.8 | 10.4 | 40 | 202 | 25 | A | 98 | 98 |
| Comparative Example 1 | Separator 3 | 9.6 | 11 | 68 | 189 | 31 | C | 97 | 96 |
| Comparative Example 2 | Separator 4 | 4.2 | 10.8 | 29 | 190 | 18 | A | 99 | 99 |

INDUSTRIAL APPLICABILITY

A separator for nonaqueous secondary battery having excellent shutdown properties and ion permeability can be obtained by using the alumina slurry of the present invention. Since a nonaqueous electrolyte secondary battery using the separator prevents the separator from directly contacting with positive and negative electrodes even if the battery intensely generates heat, and also becomes a high-safety nonaqueous electrolyte secondary battery by maintaining insulation properties due to quick changing of a polyolefin porous film into a non-porous material, the present invention is significantly useful in industry.

The invention claimed is:

1. A laminated porous film in which a heat-resistant layer comprising alpha-alumina particles and a binder is formed on one or both surfaces of a porous film made of a polyolefin base material, wherein
    the porosity of the heat-resistant layer is within a range of 30 to 65% by volume;
    the powder falling ratio of the heat-resistant layer is 30% or less; and
    the content of Zr in the alumina solid component is 300 ppm or more calculated on a weight basis.

2. The laminated porous film according to claim 1, wherein the thickness of the heat-resistant layer is within a range of 1 μm or more and 15 μm or less.

3. The laminated porous film according to claim 1, wherein the air permeability of the laminated porous film is within a range of 50 to 300 seconds/100 cc.

4. The laminated porous film according to claim 1, wherein the heat shape retention ratio of smaller value of those in MD direction or TD direction of the porous film made of a polyolefin base material is 85% or more.

5. The laminated porous film according to claim 1, wherein the binder is a water-soluble polymer which is selected from the group consisting of carboxymethyl cellulose, alkyl cellulose, hydroxyalkyl cellulose, starch, polyvinyl alcohol, and sodium alginate, or salts of the water-soluble polymer.

6. The laminated porous film according to claim 1, wherein the laminated porous film comprises alpha-alumina particles in an amount within a range of 100 to 10,000 parts by weight, based on 100 parts by weight of the binder.

7. The laminated porous film according to claim 1, wherein the porosity of the porous film made of a polyolefin base material is within a range of 30 to 70% by volume.

8. The laminated porous film according to claim 1, wherein the porous film made of a polyolefin base material of which the pore diameter is 1 μm or less has a structure including connected pores therein.

9. The laminated porous film according to claim 1, wherein the air permeability of the porous film made of a polyolefin base material is within a range of 50 to 300 seconds/100 cc.

10. The laminated porous film according to claim 1, wherein the porous film made of a polyolefin base material comprises a polyethylene composed mainly of ethylene and having a weight average molecular weight of $5 \times 10^5$ to $15 \times 10^6$.

11. The laminated porous film according to claim 1, wherein the alpha-alumina particles satisfy all particle diameter distribution conditions (a) to (d) mentioned below,
    Condition (a): the average particle diameter is 1 μm or less,
    Condition (b): particles having a particle diameter of less than 0.2 μm account for 7% by weight or less,
    Condition (c): particles having a particle diameter of more than 1.5 μm account for 15% by weight or less,
    Condition (d): one or more frequency maximums exist(s) in a particle diameter range of 0.1 μm or more and less than 0.5 μm.

12. The laminated porous film according to claim 11, wherein the alpha-alumina particles have an alumina purity of 90% by weight or more.

13. The laminated porous film according to claim 11, wherein the alpha-alumina particles further satisfy all particle diameter distribution conditions (e) to (g) mentioned below, Condition (e): particles having a particle diameter of 0.5 µm or more and less than 1 µm account for 40% by weight or less, Condition (f): one or more frequency maximums exist(s) in a particle diameter range of 1 µm or more, Condition (g): relations of expressions (1) and (2) below are satisfied:

$$2 \times D1 \leq D2 \leq 5 \times D1 \qquad (1)$$

$$(M1/M2) \geq 0.8 \qquad (2)$$

where

D1 denotes a maximum particle diameter of a frequency maximum showing the smallest maximum particle diameter among frequency maximums which appear in a particle diameter range of 0.1 µm or more and less than 0.5 µm in the condition (d), and M1 denotes a maximum value; and D2 denotes a maximum particle diameter of a frequency maximum showing the largest maximum particle diameter among frequency maximums which appear in a particle diameter range of 1 µm or more in the condition (f), and M2 denotes a maximum value.

14. The laminated porous film according to claim 1, wherein the amount of coarse particles having a particle diameter of 10 µm or more is 10 ppm or less in the alpha-alumina particles.

15. The laminated porous film according to claim 1, wherein the content of Zr in the alumina solid component is 300 ppm or more and 1,500 ppm or less calculated on a weight basis.

16. The laminated porous film according to claim 15, wherein the content of Zr in the alumina solid component is 500 ppm or more and 1,500 ppm or less calculated on a weight basis.

17. A nonaqueous electrolyte secondary battery, comprising the laminated porous film according to claim 1.

* * * * *